United States Patent Office 3,107,887
Patented Oct. 22, 1963

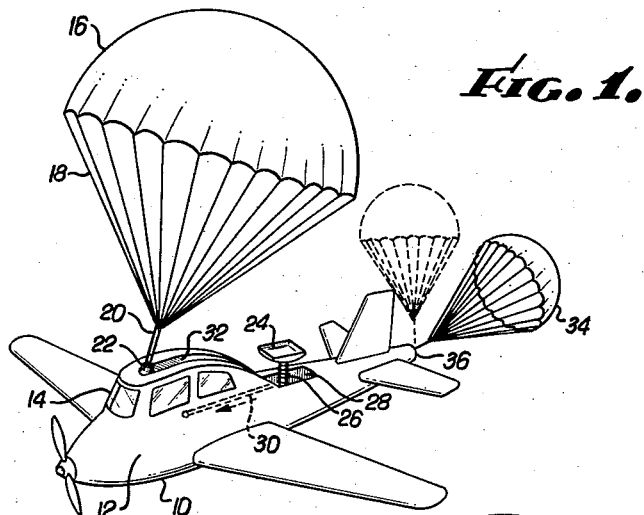
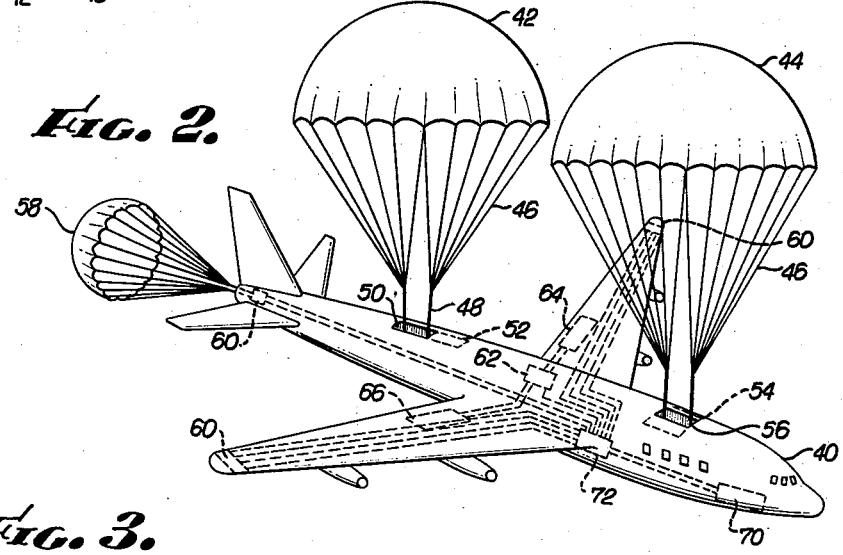
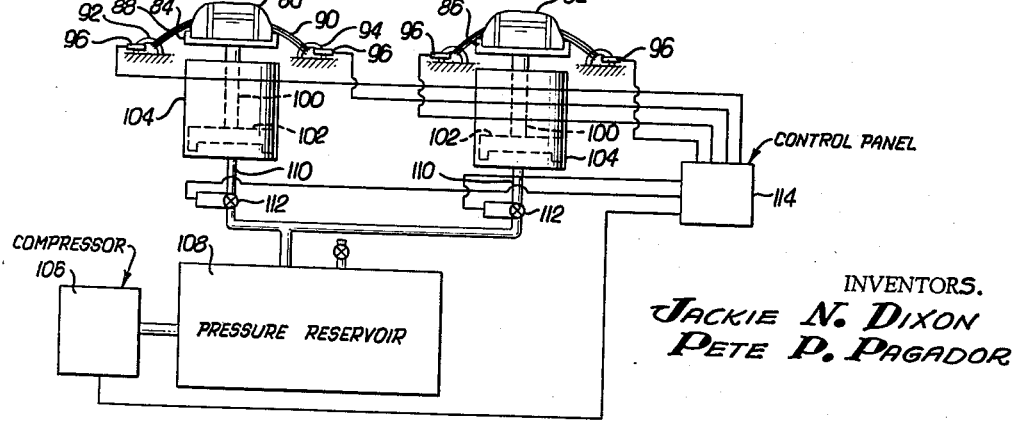
INVENTORS.
JACKIE N. DIXON
PETE P. PAGADOR

3,107,887
AIRCRAFT SAFETY SYSTEM
Jackie N. Dixon, 1438 E. 215th St., Torrance, Calif., and Pete P. Pagador, 24424 Fries Ave., Wilmington, Calif.
Filed Apr. 12, 1962, Ser. No. 186,883
1 Claim. (Cl. 244—139)

This invention relates generally to passenger carrying aircraft, and more particularly to an improved system for safely lowering a disabled, airborne craft to earth.

In the field of modern aviation, in spite of continuously rapid advances in technology towards safer and more reliable aircraft and ground systems, there continues to be a large number of deaths, injuries, and incidents of great property loss due to the failure of the aircraft or their sub-systems. In most instances, the damage occurs because of a loss of control or an engine power failure; and destruction or damage to the craft or its occupants does not occur until it suffers an impact with the earth.

In the case of heavy, modern, high velocity turbo-jet arcraft, a loss of power, even when control is preserved, generally causes a catastrophic landing because of the inability of such craft to land on any surface other than a deeply paved airstrip.

Some attempts in the past to prevent the destructive precipitation of a disabled plane have typically been directed toward means for decreasing the stalling velocity of the plane. By such means the plane may lower the velocity of impact with the earth and thereby increase the probability of passengers surviving the landing. However, such approaches obviously are not adequate solutions and they generally require extremely complex equipment or constitute a compromise in the efficiency, velocity, or aerodynamic characteristics of the craft.

Another general approach in the prior art has been to minimize the risk of injury within the cabin by strengthening the structure of the cabin, reinforcing and separating the fuel reservoirs from the cabin, and providing impact shock absorption elsewhere in the air frame. Again, such an approach does not provide an adequate solution to the problem of safely landing a disabled airplane.

It is therefore an object of the present invention to provide a system for safely lowering a disabled aircraft which system is not subject to the above and other disadvantages and limitations.

It is another object to provide such a system which lowers any size or weight of airborne craft to the earth safely regardless of available power or air frame control.

It is another object to provide such a system in which the lowering means may be jettisoned upon landing or while airborne in the event that the trouble in the aircraft is cured.

Briefly, these and other objects are achieved in accordance with one aspect of the invention in which a housing internally of the skin of the air frame is provided and in which a hydraulically operated launching yoke is supported. The yoke is coupled through a remotely controlled valve to a source or reservoir of hydraulic pressure. A cargo-type parachute is disposed in the launching yoke with its shrouds divided, for greater stability, and secured at their load ends by shackles secured rigidly to the air frame.

One shank of each shackle may be separated by an explosive connection remotely actuated whereby the parachute may be jettisoned at any time by the operator.

A second, similar parachute may be disposed elsewhere on the air frame for greater stability regarding the attitude of the aircraft during descent. A second parachute may be utilized in order better to distribute the weight and space requirements for the system during normal operation of the aircraft.

A drag parachute, similarly housed in the tail of the plane, is provided in the case of higher velocity airplanes. The drag parachute may be utilized for initially slowing the plane before the larger parachutes are deployed and then contribute to the vertical slowing of the craft during descent. In addition, the drag parachute stabilizes the heading of the craft into the wind and may be retained after descent for stabilization in heavy seas. Further, in the event that the trouble is cured, the drag parachute is retained after the others are jettisoned to provide downward directional stability for the aircraft until a control velocity is obtained; then the drag parachute may also be jettisoned.

The horizontal attitude of the craft is controlled and maintained within tolerable limits during descent by jettisoning remotely removable weights including fixtures and skin plates, particularly those disposed near the wing tips and the tail. Baggage, cargo and fuel may be selectively jettisoned further to control the craft attitude.

Further details of these and other novel features and their principles of operation, as well as additional objects and advantages of the invention, will become apparent and be best understood from a consideration of the following description taken in connection with the accompanying drawing, which is presented by way of illustrative example only, and in which:

FIG. 1 is a perspective view of one embodiment of an aircraft safety system constructed in accordance with the principles of the present invention;

FIG. 2 is a perspective view of an alternative embodiment of the invention; and

FIG. 3 is a schematic view of a portion of an aircraft safety system constructed in accordance with the principles of the invention.

Referring to the particular figures, it is stressed that the details shown are by way of example only and are presented in the cause of providing what is believed to be the most useful and readily understood description of the principles of the invention. The detailed showing is not to be taken as a limitation upon the scope of the invention which is defined by the appended claim forming a part of this specification.

In FIG. 1 there is depicted an example of an aircraft safety system in operation. A light plane 10 including a fuselage 12 having a substantially transparent cabin 14 disposed approximately over the center of gravity of the air frame is shown being supported during descent by a large parachute 16. The shrouds 18 of the parachute 16 are connected at their load end 20 to a releasable shackle 22. Control means, not shown, accessible from within the cabin 14 are provided for opening the shackle 22 when it is desired to release or jettison the parachute 16. This may be desirable in the event that the difficulty with the aircraft is cured or upon landing to prevent further damage to the aircraft due to high winds dragging the parachute.

Prior to deployment of the parachute 16 in the emergency, the parachute is compactly folded and stored in a launching cradle 24 which is pressed downwardly against a launching energy storage device 26 which may be a strong coil spring arranged about the shank of the cradle 24. Prior to deployment of the parachute, the launching cradle is held downwardly against the spring 26 by a latch 30 which is remotely operable from within the cabin 14. When the latch 30 is operated to release the launching cradle which is then thrust upwardly and outwardly due to the action of the spring 26, the housing cover for the parachute package housing 28 is pushed off and automatically jettisoned by the impact from below of the launching cradle.

Although the parachute 16 is normally stored in the parachute housing 28, its shrouds 30 at the same time may be attached to the shackle 22 in order to be ready for immediate use in an emergency. The shrouds are disposed in a shroud channel 32 which communicates between the shackle 22 and the parachute housing 28. The shroud channel 32 may also be covered with an easily removable shroud cover which is automatically opened by the action of the launching cradle during deployment of the parachute and the tension upwardly and outwardly of the shrouds of the launched parachute.

A drag parachute 34 may be similarly housed within the tail portion 36 of the fuselage 12. In an emergency, the drag parachute may be first deployed to slow the aircraft 10 as much as possible before the main parachute 16 is deployed. After both parachutes are deployed, the drag parachute 34 in the position indicated by the dotted lines in the figure may be utilized to assist in the lowering of the aircraft toward the earth, and at the same time may provide a heading stabilization so that the aircraft will not spin but will head continuously into the wind. Further in the event the aircraft lands in rough seas, the drag parachute 34 may be retained to provide a safer heading into the wind or current of the water.

Referring to FIG. 2, an embodiment of the invention is illustrated in combination with a larger, transport aircraft 40. In this example, two large parachutes 42, 44 may be utilized to lower the larger aircraft. The use of two such parachutes instead of a single larger parachute is advantageous in some applications because of the greater stability afforded the attitude of the aircraft during descent, and because the storage space within the fuselage required during normal operation interferes much less with the interior arrangement of the air frame than when a single larger storage package is utilized. The shrouds 46 of the large parachutes may be divided near their load ends 48 and attached to separate shackles to provide greater stability against spinning of the parachute 42 during descent. The parachute 42 is stored within a parachute housing 50 having a slidable or jettisonable canopy 52 which in a streamlined manner covers the housing 50 during normal operation of the aircraft. Similarly, a pair of sliding or folding canopy portions 54 may be provided for covering the housing 56 or the parachute 44. Again, a drag parachute 58 may be deployed from the tail of the aircraft for initial slowing of the plane in the emergency and for heading stability during descent. Further details of the main parachutes will be discussed in connection with the description of FIG. 3 below.

In order to assure that the attitude of the aircraft during descent will be held within tolerable limits as opposed to standing on its tail or one wing, for example, a plurality of adjustable weights and fixtures 60 are disposed in each wing tip and in the tail of the aircraft. The weights and fixtures may consist of the skin plates or the entire wing tip and may be jettisoned selectively by the operation of electrically actuated explosive fasteners, not shown. Additional attitude control is achieved with a fuel pump 62 which communicates between the fuel storage system 64, 66 which are disposed respectively in each of the wing sections of opposite sides of the aircraft. Thusly by pumping fuel from the low side to the high side, a tendency toward leveling of the aircraft during descent may be achieved.

Additional fore and aft levelling may be achieved by jettisoning the drag parachute 58 which provides considerable lift during vertical descent and by selectively jettisoning the baggage capsules 70. All such jettisoning and fuel balancing is centrally controlled from a control panel 72 which is electrically coupled to each of the remote jettisoning and pumping means.

In FIG. 3 further details of the system for storing and launching the main parachutes is illustrated. Each of the cargo-type parachutes 80, 82 is compactly folded and stored in a launching cradle 84, 86 respectively. The shrouds of each of the parachutes are divided as shown into two bundles 88, 90 and affixed at their load ends to shackles 92, 94 respectively. One shank of each of the shackles contains an explosive fastener 96 which may be electrically remotely actuated to break the shackle and thusly release the parachute when it is desired to jettison it. It is desirable in some applications to provide a spare parachute for each of the main cargo parachutes. In such applications, a parachute 82 may be considered the spare parachute which is separably launchable with respect to the parachute 80. In other applications, both parachutes may be launched simultaneously and deployed together to lower the aircraft as slowly as possible.

Each of the launching yokes or cradles 84, 86 is affixed through a shaft 100 to a launching piston 102 disposed and engaged within a matching cylinder 104.

An air compressor 106 coupled to a pressure reservoir 108 is provided to supply hydraulic pressure to actuate and launch the parachutes 80, 82. The pressure reservoir 108 may be continuously under pressure or may be pumped in a few minutes after the emergency arises to an adequate pressure for actuating the piston 102. A pressure line 110 communicates between each of the cylinders 104 and the pressure reservoir 108. Interposed in each of the pressure lines 110 is an electrically remotely operable solenoid valve 112. Upon actuation of the valves 112 selectively from a control panel 114, either or both of the parachutes 80, 82 may be deployed when desired. The explosive fasteners 96 are similarly selectively remotely controllable from the control panel 114.

In operation, when a predetermined magnitude of pressure is available in the pressure reservoir 108, one or more of the solenoid valves 112 may be actuated to provide immediate communication between the reservoir 108 and the interior of the cylinder 104 below the piston 102. This operates to throw the launching cradle 84 upwardly and outwardly carrying the parachute 80 with it and to project it therebeyond. Just before the shrouds 88, 90 have been fully extended, a rip cord, not shown, which is attached to the air frame and to the parachute package is stretched full length and its resulting tension opens and deploys the parachute 80 in a totally conventional parachute deploying manner. When all the desirable parachutes have been deployed and the attitude of the aircraft has been adjusted to within tolerable limits, the plane may be permitted to descend to the ground without further attention to the safety system. Upon impact with the ground or sea, however, it is normally desirable to release and jettison immediately the large cargo-type parachutes. The smaller drag parachute 58 may be retained when desired for heading stability when the craft has come down in water.

There has thus been disclosed a number of embodiments and examples of an aircraft safety system which exhibits the advantages and achieves the objects set forth hereinabove.

What is claimed is:

An aircraft safety system in combination with an airframe having a fuselage and a longitudinal center of gravity, a central control location, a tail portion, and at least one wing having wing halves extending symmetrically from each of opposite sides of said fuselage and having fuel tanks housed within each of the wing halves, said safety system comprising:

first and second parachute launching means disposed respectively fore and aft of said center of gravity and each including:

a cargo type parachute housing in said fuselage, hydraulically cooperatively arranged cylinder and piston having a substantially vertical axis of action, a parachute launching cradle disposed on and carried by the upper end of said piston, a pair of explosively partable shroud shackles affixed to said fuselage adjacently to opposite side of said housing, electrical means operable from said central control location for explosively parting said shroud shackles;

an air compressor and a pressure reservoir communicating therewith and disposed in said fuselage; hydraulic conduit means communicating between said reservoir and each of said cylinders; valve means electrically operable from said central control location for selectively connecting the interior of said pressure reservoir with the interior of respective ones of said cylinders for causing the abrupt upward, parachute launching movement of said pistons; first and second cargo type parachutes compactly disposed in a respective one of said launching cradles and each having a pair of shroud bundles having lower ends which bundles are each connected to a respective one of said shroud shackles;

a third, drag parachute compactly housed within said tail portion and including remotely operable launching and jettisoning means;

jettisonable weights disposed on the tips of said wing and in said fuselage;

means operable from said central control location for selectively jettisoning said weights to balance the attitude of said airframe during parachute descent; and pump means operable from said central control location and communicating between said fuel tanks for selectively pumping said fuel from one said wing half to the other during descent.

References Cited in the file of this patent
UNITED STATES PATENTS

| | | |
|---|---|---|
| 1,081,137 | Von Augezd | Dec. 9, 1913 |
| 1,325,441 | Kempin | Dec. 16, 1919 |
| 1,347,157 | Hanson | July 20, 1920 |
| 1,782,134 | Coplen | Nov. 18, 1930 |
| 1,849,970 | Barber | Mar. 15, 1932 |
| 2,118,603 | Hailey | May 24, 1938 |
| 2,585,480 | Makhonine | Feb. 12, 1952 |
| 2,665,093 | Manfredi et al. | Jan. 5, 1954 |
| 2,699,908 | Fletcher | Jan. 18, 1955 |
| 2,702,680 | Heinemann et al. | Feb. 22, 1955 |
| 2,729,408 | Quilter | Jan. 3, 1956 |
| 2,880,749 | Brown | Apr. 7, 1959 |
| 2,940,703 | Lent | June 14, 1960 |
| 3,010,685 | Stencel | Nov. 28, 1961 |
| 3,017,141 | Ollodort | Jan. 16, 1962 |
| 3,051,420 | Novak | Aug. 28, 1962 |

FOREIGN PATENTS

| | | |
|---|---|---|
| 302,671 | Great Britain | Dec. 18, 1928 |
| 528,597 | Italy | June 14, 1955 |
| 1,136,515 | France | Dec. 29, 1956 |